United States Patent
Takagi

[11] Patent Number: 5,177,532
[45] Date of Patent: Jan. 5, 1993

[54] IMAGE FORMING APPARATUS FOR ADJUSTING GRADATION USING SUBSIDIARY EXPOSURE

[75] Inventor: Atsushi Takagi, Kanagawa, Japan
[73] Assignee: Fuji Photo Film Co., Ltd., Kanagawa, Japan
[21] Appl. No.: 509,829
[22] Filed: Apr. 17, 1990
[30] Foreign Application Priority Data
  Apr. 18, 1989 [JP] Japan .................. 1-98089
  Apr. 20, 1989 [JP] Japan .................. 1-101044
[51] Int. Cl.⁵ ............................................. G03B 27/72
[52] U.S. Cl. .................................. 355/214; 355/38; 355/77; 355/228
[58] Field of Search ............... 355/38, 228, 214, 77, 355/70, 68, 69, 239, 218

[56] References Cited
U.S. PATENT DOCUMENTS

| | | | |
|---|---|---|---|
| 3,864,036 | 2/1975 | Vanheerentals | 355/68 |
| 4,739,375 | 4/1988 | Kuzyk et al. | 355/69 |
| 4,809,198 | 2/1989 | Terashita | 355/38 X |
| 4,830,501 | 5/1989 | Terashita | 355/204 X |
| 4,841,340 | 6/1989 | Tokuda | 355/38 |
| 4,866,475 | 9/1989 | Suzuki | 355/38 |
| 4,873,546 | 10/1989 | Zahn et al. | 355/38 |
| 4,942,424 | 7/1990 | Terashita et al. | 355/38 |
| 4,952,969 | 8/1990 | Hara | 355/27 |

*Primary Examiner*—A. T. Grimley
*Assistant Examiner*—T. A. Dang
*Attorney, Agent, or Firm*—Sughrue, Mion, Zinn, Macpeak & Seas

[57] ABSTRACT

When to perform subsidiary exposure before or after main exposure or concurrently therewith with a quantity of light corresponding to about 1/50 to 1/100 of the quantity of light of main exposure, an image forming apparatus according to the present invention can automatically set the standard conditions of subsidiary exposure in response to setting of the standard conditions of main exposure, and can set the optimal conditions of colors and intensity of subsidiary exposure in accordance with the amount of adjustment of gradation. Therefore, even when variations arise in the characteristics and processing conditions of a light-sensitive material or any desired gradation is chosen, natural and fine images can always be formed with no color balance distorted.

15 Claims, 5 Drawing Sheets

IMAGE FORMING APPARATUS FOR ADJUSTING GRADATION USING SUBSIDIARY EXPOSURE

BACKGROUND OF THE INVENTION

1. Field of the Invention

This invention relates to an image forming apparatus capable of adjusting the gradation of an image by the use of subsidiary exposure.

2. Description of the Prior Art

Hitherto, in conventional image forming apparatus, the quality of an image being formed was adjusted by gradation adjustment.

Conventional methods of gradation adjustment are to adjust exposure conditions, such as the quantity of light and exposure time of a light source for exposure, to adjust developing conditions, such as the temperature and time of a developing process, to insert various filters into a light path of exposure, to change a light-sensitive material and/or an image receiving material, and so on. However, in view of the cost of forming an image, the price of an image forming apparatus, the efficiency of working, and so on, the method of making use of subsidiary exposure is widely put in practice.

According to one method of adjusting the gradation of an image by the use of subsidiary exposure, a gray (achromatic color) reflecting plate for subsidiary exposure is provided in the vicinity of an original bed mounted on a copying machine of the direct exposure type, this reflecting plate is illuminated by a light source before or after main exposure, and a light-sensitive material is exposed to the reflected light from the reflecting plate whose quantity of light is in a range corresponding to 1/50 to 1/100 of the quantity of light of main exposure.

In Japanese Patent Application Kokai No. 1-303427, a copying machine was proposed which, without using a reflecting plate for subsidiary exposure, performs subsidiary exposure using a white reference plate and a variable stop to adjust the gradation of an image being formed, whereby images of desired gradation are formed.

In the foregoing copying machine, subsidiary exposure or gradation adjustment is performed by decreasing the quantity of light of the reflected light from the white reference plate by means of the variable stop to a level corresponding to 1/50 to 1/100 of the quantity of light of main exposure. Since the variable stop can freely adjust the quantity of light of subsidiary exposure, images of desired gradation are readily copied and formed.

The foregoing copying machine demands no additional expense and can adjust the gradation of an image by simple mechanisms. Since images of any gradation are formed by adjusting the quantity of light by means of the variable stop, the degree of freedom of gradation adjustment is high compared to a machine including a reflecting plate for subsidiary exposure, and images of any desired gradation are readily formed.

In another type of copying machine wherein subsidiary exposure is performed using a gray reflecting plate exclusive to subsidiary exposure, however, the quantity of light of subsidiary exposure is fixed and not changeable; therefore, it is impossible to change the amount of adjustment of gradation in accordance with user's desire to form images of desired gradation.

In the copying machine disclosed in Japanese Patent Application Kokai No. 1-303427, only the quantity of light of subsidiary exposure can be changed linearly within a range corresponding to 1/50 to 1/100 of the quantity of light of main exposure in accordance with the change of gradation; therefore, the gradation can be adjusted to a certain extent. However, even in the type wherein the optimal or standard conditions of color filter and aperture of main exposure are set automatically, the color balance of formed images is distorted depending on the amount of adjustment of gradation, resulting in unnatural images. Therefore, there is obtained no image whose gradation is adjusted as desired.

The scanning exposure type and the one-shot plane exposure type differ in change of gradation even where subsidiary exposure is performed using the same quantity of light, because the strength of light and time of exposure differ between the two types even where the quantity of light impinging on a light-sensitive material is the same. Particularly, even where the quantity of light of subsidiary exposure is the same, the scanning exposure type is weaker in strength of exposure light and longer in exposure time than the plane exposure type, resulting in a difference in, for example, change of gradation among the three primary colors (yellow (Y), magenta (M), cyan (C)).

Therefore, to always form fine images of good color balance irrespective of the amount of adjustment of gradation caused by subsidiary exposure, images must be actually formed from an original picture or test chart using subsidiary exposure; color filters (yellow (Y), magenta (M), cyan (C)) and a stop must be adjusted manually at the time of subsidiary exposure while observing the thus obtained hard copies of images; and the foregoing steps must be repeated to set the optimal conditions of subsidiary exposure.

Further, even where the optimal conditions of color filter and aperture of subsidiary exposure are set, if the characteristics of light-sensitive materials and/or image receiving materials, the property of images, the characteristics of developing/fixing solutions, the heat developing temperature, the processing conditions, and so on change, the optimal conditions of subsidiary exposure change even after adjusting the color and quantity of light of main exposure, thereby resulting in unnatural images of distorted color balance.

A further type is known in which the optimal or standard conditions of subsidiary exposure are adjusted independent of main exposure. However, since the standard conditions of main exposure are obtained independent of those of subsidiary exposure, complicated image adjustment must be performed.

BRIEF SUMMARY OF THE INVENTION

It is a first object of the present invention to provide an image forming apparatus of the type wherein the gradation of an image being formed is changed by subsidiary exposure, which is capable of forming natural images whose color balance is not distorted irrespective of how the gradation is changed.

It is a second object of the present invention to provide an image forming apparatus of the type wherein the gradation of an image being formed is adjusted by subsidiary exposure, which is capable of automatically setting the optimal or standard conditions of color filter and aperture of main exposure in compliance with the characteristics and processing conditions of light-sensitive and/or image receiving materials, automatically setting the optimal or standard conditions of subsidiary exposure on the basis of the standard conditions of main exposure, and thus always forming images of good color balance and natural color tone.

To achieve the above-described objects, there is provided by its first aspect of the present invention an image forming apparatus in which a gradation of an image being formed is adjusted by subsidiary exposure, characterized in that when adjusting the gradation by subsidiary exposure, color and intensity conditions of subsidiary exposure are predetermined in accordance with an amount of adjustment of gradation are set.

In a preferred embodiment of the first aspect, said amount of adjustment of gradation is adjusted centering on color and intensity standard conditions determined in accordance with a quantity of light of subsidiary exposure.

In another preferred embodiment of the first aspect, said color and intensity conditions of subsidiary exposure are given in the form of combinations of an amounts of correction of color and intensity that are deviations from the standard conditions of subsidiary exposure so as to provide optimal images.

In still another preferred embodiment of the first aspect, changing of the gradation from the standard conditions of subsidiary exposure is set such that the amounts of correction of color and intensity of subsidiary exposure increase as deviating from the standard conditions of subsidiary exposure.

In a further preferred embodiment of the first aspect, wherein the color and intensity of subsidiary exposure are set in accordance with characteristics and developing conditions of a light-sensitive material used so as to provide optimal images.

Further, there is provided by its second aspect of the present invention an image forming apparatus in which the gradation of an image being formed is adjusted by subsidiary exposure, including a memory unit for storing a relationship between standard conditions of color and intensity of subsidiary exposure and standard conditions of color and intensity of main exposure with no subsidiary exposure performed, by which the standard conditions of subsidiary exposure are set from the standard conditions of main exposure automatically.

In a preferred embodiment of the second aspect, said main exposure is scanning exposure.

In another preferred embodiment of the second aspect, said subsidiary exposure is performed before or after the main exposure or concurrently therewith.

In still another preferred embodiment of the second aspect, wherein a quantity of light of the subsidiary exposure corresponds to 1/50 to 1/100 of a quantity of light of the main exposure.

In a further preferred embodiment of the second aspect, the standard conditions of color and intensity of the main exposure are set automatically.

In another preferred embodiment of each aspect, the image forming apparatus uses a light-sensitive material.

In still another preferred embodiment of each aspect, said image forming apparatus is a copying machine.

DETAILED DESCRIPTION OF THE INVENTION

An image forming apparatus according to a first aspect of the present invention is of the type wherein the gradation of an image being formed is adjusted by subsidiary exposure, which is characterized in that the adjustment of gradation by subsidiary exposure is performed under the color and/or intensity conditions of subsidiary exposure predetermined in accordance with the amount of adjustment of gradation.

Therefore, the image forming apparatus of the first aspect of the present invention can form images of desired gradation. Since subsidiary exposure is performed under the color and/or intensity conditions of subsidiary exposure predetermined in accordance with the amount of adjustment of gradation, the color and/or intensity of subsidiary exposure in addition to the quantity of light of subsidiary exposure is desirably adjusted; therefore, natural and fine images of any gradation can be formed whose color balance is not distorted.

Preferably, the amount of adjustment of gradation is adjusted centering on the standard conditions of color and/or intensity determined on the basis of the quantity of light of subsidiary exposure; therefore, images of desired gradation can be formed when an operator chooses a certain gradation and sets it in the image forming apparatus at the time of image forming. Further, the change or deviation of gradation from the standard conditions is set such that the amounts of correction of colors and/or density of subsidiary exposure increase as deviating from the standard conditions of subsidiary exposure; therefore, the gradation of images being formed can be readily selected.

Preferably, the color and/or intensity conditions of subsidiary exposure are given in the form of combinations the amounts of correction of colors and/or density that are deviations from the standard conditions of subsidiary exposure; therefore, the subsidiary exposure conditions (the color and/or intensity conditions) pertaining to the amounts of adjustment of gradation can be readily set, so that natural and fine images of desired gradation can always be formed by a simple manner of control.

Preferably, the color and/or intensity conditions of subsidiary exposure are set in compliance with the characteristics and/or developing conditions of a light-sensitive material used so as to provide optimal image quality, or the standard conditions and the amounts of correction of colors and/or density of subsidiary exposure with respect to each gradation are set in accordance with the changes of characteristic and/or developing condition of the light-sensitive material; therefore, fine images can be formed.

In an image forming apparatus according to a second aspect of the present invention, particularly of the scanning exposure type, since the characteristics and processing conditions of light-sensitive material and/or image receiving material vary, for the purpose of always forming optimal images, images are actually formed (at the time of machine installation, changing of the materials and processing conditions, periodic inspection, and so on) using a test chart or test pattern to provide hard copies, the color density of these hard copies is measured by three primary color sensors of R, G, B included in an image sensor and compared with that of the test chart or pattern previously measured, and on the basis of the results of comparison, the standard conditions of color and/or intensity of main exposure, or the extent of insertion ($\Delta Y$, $\Delta M$, $\Delta C$, $\Delta D$) of color filter Y, M, C and aperture D into a light path (a reference value is set to "0", for example) are set.

According to the second aspect of the present invention, the standard conditions of colors and/or density of subsidiary exposure are obtained on the bases of the standard conditions ($\Delta Y$, $\Delta M$, $\Delta C$, $\Delta D$) of main exposure. Specifically, letting $\Delta Ds$ be the quantity of light of subsidiary exposure, the extents of insertion ($\Delta Ys$, $\Delta Ms$, $\Delta Cs$; a reference value is set to "0", for example) of color filter of subsidiary exposure are obtained in accordance with the following expressions by fetching $k_1$, $k_2$, $k_3$, $\alpha$, $\beta$, $\gamma$ correspondent to Ds out of the data stored in a memory unit:

$$\Delta Ys = k_1 \cdot \Delta Y + \alpha$$

$$\Delta Ms = k_2 \cdot \Delta M + \beta$$

$$\Delta Cs = k_3 \cdot \Delta C + \gamma$$

In this way, the standard conditions ($\Delta Ys$, $\Delta Ms$, $\Delta Cs$, $\Delta Ds$) of subsidiary exposure are set automatically. As will be appreciated, in the image forming apparatus according to the second aspect of the present invention, the standard conditions ($\Delta Y$, $\Delta M$, $\Delta C$, $\Delta D$) of color and/or intensity of main exposure can be set automatically, and on the basis of the standard conditions of main exposure and the quantity of light $\Delta Ds$ of subsidiary exposure and using the relational data stored in the memory unit, the standard conditions ($\Delta Ys$, $\Delta Ms$, $\Delta Cs$, $\Delta Ds$) of color and/or intensity of subsidiary exposure can be set automatically. Therefore, in the normal process of forming images using main exposure alone, as well as in the process of forming images of desired gradation using main exposure after subsidiary exposure, fine images of good color balance can always be formed with good reproducibility in terms of color and intensity.

Preferred embodiments of an image forming apparatus according to the present invention will now be described in greater detail with reference to the drawings.

Figure 1:
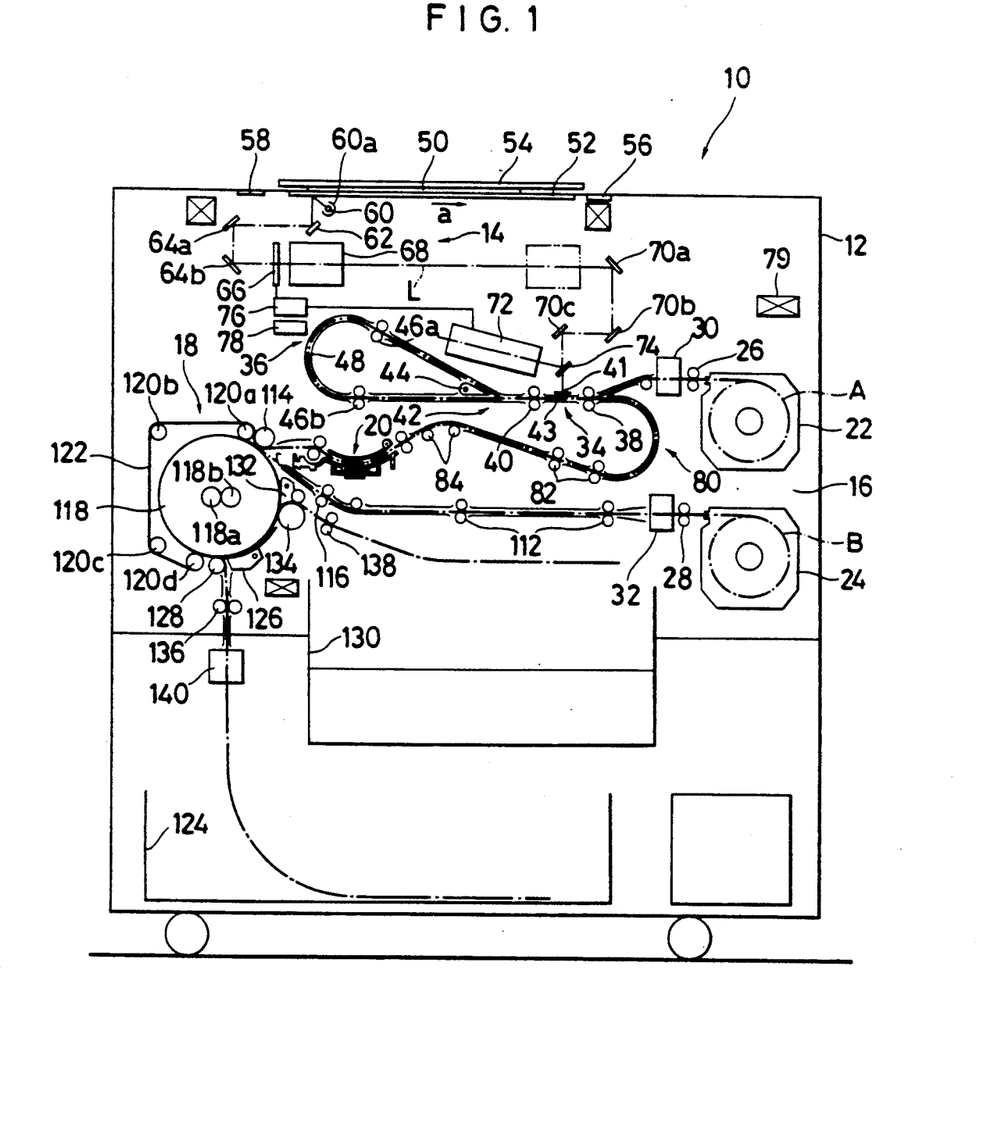
FIG. 1 is a schematic sectional view showing an embodiment of an image forming apparatus according to the present invention in the form of a copying machine.

FIG. 1 shows an image forming apparatus according to the present invention which is embodied in the form of a copying machine 10. This copying machine 10 uses, as a recording material, a light-sensitive material A which demands a heat developing step and transcribes an image onto an image receiving material B (having an image receiving layer) under the presence of an image forming solvent such as water.

The copying machine 10 shown in FIG. 1 fundamentally comprises an exposing unit 14 provided in an upper portion of a housing 12, a light-sensitive material/image receiving material supplying section 16 (referred to as the supply section 16) provided in a side portion of the housing 12, a heat developing/transcribing section 18 provided in another side portion of the housing 12 that is opposite to the supply section 16, and a water applying section 20 provided between the supply section 16 and the heat developing/transcribing section 18.

The supply section 16 includes a light-sensitive material magazine 22 for storing the light-sensitive material A in rolled form and an image receiving material magazine 24 for storing the image receiving material B in rolled form. Both the light-sensitive material magazine 22 and the image receiving material magazine 24 are adapted to be pulled out toward the front side of the housing 12 (in a direction perpendicular to the traveling direction of the light-sensitive material A, i.e. in the rising direction on the drawing sheet).

The light-sensitive material magazine 22 is completely shielded from light in its accommodated state in the housing 12, so that the light-sensitive material A is never exposed to light accidentally.

As described above, the light-sensitive material A demands the heat developing step and transcribes an image onto the image receiving material B (having the image receiving layer) under the presence of the image forming solvent such as water; therefore, the light-sensitive material has sensitive silver halide, binder, coloring substance, reducing agent, and so on provided on a base material thereof. In the copying machine 10 illustrated, the light-sensitive material A is stored in the light-sensitive material magazine 22 in rolled form such that its sensitive surface faces down.

The image receiving material B has a coloring matter fixing material (including a mordant) coated on a base material thereof. The image receiving material B is narrower than the light-sensitive material A and is stored in the image receiving material magazine 24 in rolled form such that its image forming surface faces up.

Provided in front of or close to the outlets of the light-sensitive material magazine 22 and the image receiving material magazine 24 are take-out roller pairs 26 and 28, and provided in front of these roller pairs are cutters 30 and 32 which are adapted to cut the light-sensitive material A and the image receiving material B to given lengths.

Specifically, to facilitate separation after heat developing and transcribing processes, the image receiving material B is cut to a length shorter than the light-sensitive material A.

To prevent a leading portion of the light-sensitive material A from deteriorating through unnecessary exposure, the take-out roller pair 26 corresponding to the light-sensitive material A is reversely rotated slightly after the actuation of the cutter 30 such that only the leading portion of the light-sensitive material A is pinched by the roller pair. On the other hand, to prevent a leading portion of the image receiving material B from being damaged, the take-out roller pair 28 corresponding to the image receiving material B is released from the pinching state after the actuation of the cutter 32.

Provided in the rear of the cutter 30 (the rear means the downstream side in the traveling direction of the light-sensitive material A and image receiving material B) is an exposing section 34, and provided in the rear of the exposing section 34 is a reversing section 36.

The light-sensitive material A pulled out by the take-out roller pair 26 and cut to a given length by the cutter 30 is passed once through the exposing section 34, turned upside down in the reversing section 36, and conveyed again to the exposing section 34 where it is exposed by the exposing unit 14.

The exposing section 34 comprises conveyor roller pairs 38 and 40, an exposing plate glass 41 for defining a conveyor path and an exposing position for the light-sensitive material A lying between the conveyor roller pairs 38 and 40, and a pressure plate 43 for pressing the light-sensitive material A against the exposing plate glass 41. Specifically, the light-sensitive material A is conveyed to the reversing section 36 by the conveyor roller pairs 38 and 40 while being pinched between the exposing place glass 41 and the pressure plate 43, turned upside down in the reversing section 36 such that the light-sensitive surface faces up, and conveyed again to the exposing section 34 where it is subjected to scanning exposure by the exposing unit 14.

It should be noted that to perform subsidiary exposure to thereby adjust the gradation, the conveyor roller pairs 38 and 40 are made reversely rotatable by any known means.

The reversing section 36 comprises a branch guide 42 for branching the conveyor path of the light-sensitive material A into upper and lower, a flapper 44 for defining the conveyor path of the light-sensitive material A at the branch guide 42, conveyor roller pairs 46a and 46b, and a curved guide 48 for defining the reverse conveyor path of the light-sensitive material A.

When the light-sensitive material A is conveyed and passed through the exposing section 34, first, the flapper 44 cooperates with the lower path of the branch guide 42, so that the light-sensitive material A is guided to the upper path of the branch guide 42.

The light-sensitive material A conveyed through the upper path of the branch guide 42 is guided by the curved guide 48, turned upside down by the conveyor roller pairs 46a and 46b, and conveyed again to the exposing section 34 with the light-sensitive surface facing up. At this time, the flapper 44 cooperates with the upper path of the branch guide 42, so that the lower path of the branch guide 42 is left open.

The exposing unit 14, which embodies an important portion of the present invention, is provided above the exposing section 34 (in an upper portion of the housing 12).

Provided on the upper side of the housing 12 of the copying machine 10 are an original bed (platen) 52 made of transparent glass on which an original 50 is placed, and an original bed cover 54 for securing the original 50 on the original bed 52.

Provided close to an edge (referred to as the right edge) of the original bed 52 that is on the side of the supply section 16 is a reflecting plate 56 of achromatic color, for example, gray.

To perform subsidiary exposure to thereby adjust the gradation of an image being formed, when illuminated by a light source 60 the reflecting plate 56 provides a reflected light whose quantity of light is reduced to about 1/50 to 1/100. Specifically, before or after being subjected to main exposure by the exposing section 34, the light-sensitive material A is subjected to subsidiary exposure by the reflected light from the reflecting plate 56, whereby the gradation of an image being formed is adjusted.

Provided close to the left edge of the original bed 52 and opposite to the reflecting plate 56 is a white reference plate 58 for white balance adjustment.

Provided below the original bed 52 is a light source unit composed integrally of the light source 60 for exposure, a reflector 60a, and a mirror 62.

The light source unit is movable under the original bed 52 in the scanning direction illustrated by the arrow a to illuminate the original 50 by means of tee light source 60.

The light source 60 may be a halogen lamp or of any type usable in ordinary copying machines.

The reflected light from the original 50 (the reflecting plate 56 and the white reference plate 58) illuminated by the light source 60 enters a mirror unit where it passes along a light path L in a given direction.

The mirror unit is composed integrally of two mirrors 64a and 64b, and is movable in the same direction as the light source unit at half the speed thereof.

Provided in the rear of the mirror unit in the direction of the light path L is a variable stop 66 for light quantity adjustment.

Figure 2:
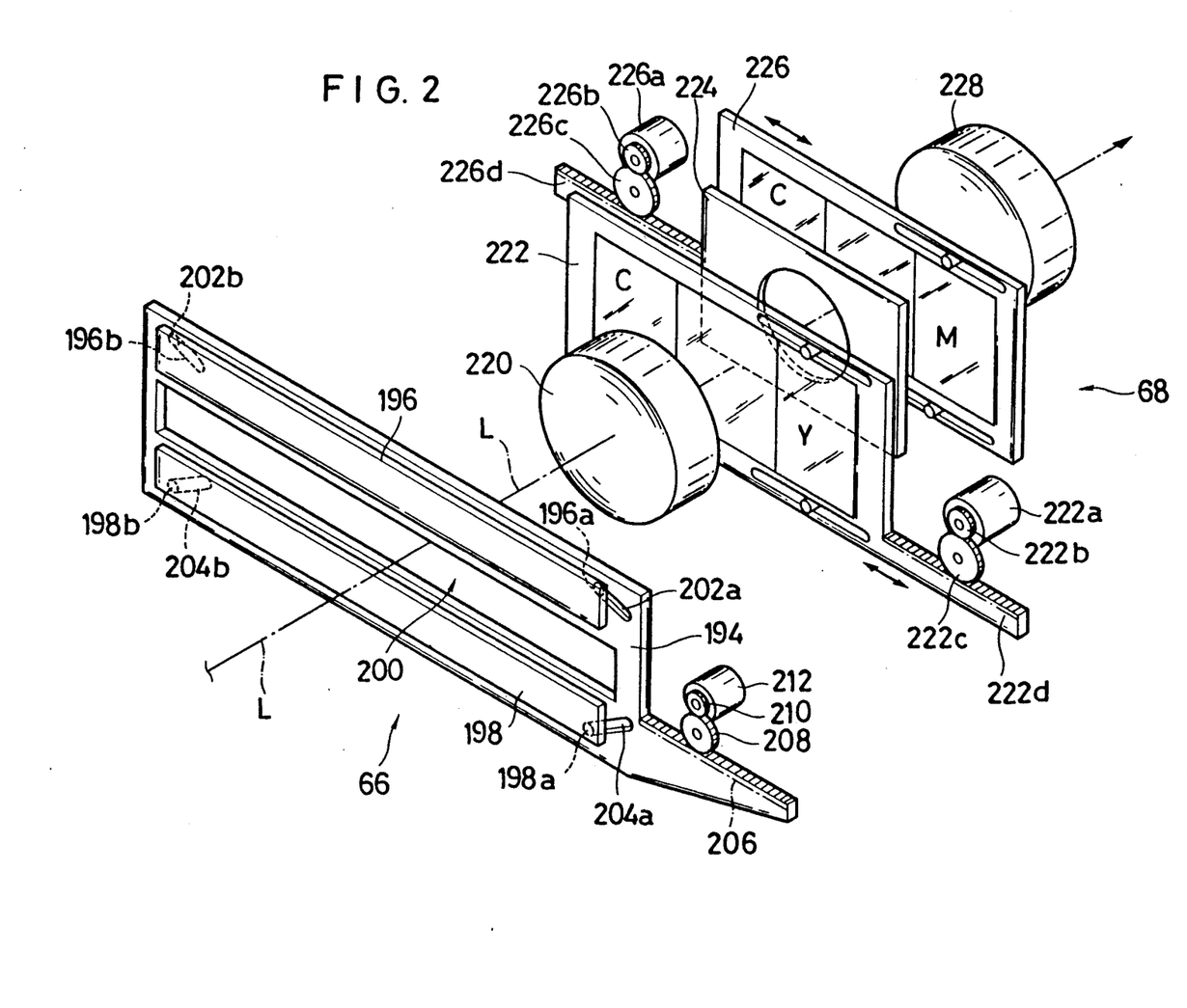
FIG. 2 is a perspective view showing an embodiment of a variable stop and lens unit usable in the copying machine shown in FIG. 1.

FIG. 2 shows examples of the variable stop 66 and a lens unit 68.

The variable stop 66 is composed fundamentally of a plate cam 194 and a pair of aperture plates 196 and 198. The quantity of the reflected light passing along the light path L is adjusted by moving the aperture plates 196 and 198 toward or away from each other by means of the plate cam 194.

The plate cam 194 has an opening 200 and a rack 206, this rack 206 being engaged via gears 208 and 210 with a stepping motor 212. Therefore, when the stepping motor 212 rotates clockwise, the plate cam 194 moves rightward in the drawing, whereas when the stepping motor 212 rotates counterclockwise, the plate cam 194 moves leftward in the drawing.

The plate cam 194 has inclined grooves 202a, 202b, 204a and 204b in which pins 196a and 196b of the aperture plate 196 and pins 198a and 198b of the aperture plate 198 are inserted.

Since the aperture plates 196 and 198 are prevented from moving laterally by means not shown, when the stepping motor 212 rotates to move the plate cam 194 laterally in the drawing, the aperture plates 196 and 198 shift vertically along the inclined grooves 202a, 202b, 204a and 204b, so that the extent of insertion of the aperture plate into the light path L varies to determine the degree of aperture D.

The reflected light passing along the light path L whose quantity of light is adjusted by the variable stop 66 then enters the lens unit 68.

The lens unit 68 is a combination of an imaging lens for focusing the reflected light from the original 50 on the light-sensitive material A under conveyance, and color filters for light quality adjustment. Specifically, arranged from the front side of the light path L are a lens front group 220 acting as the imaging lens, a first color filter plate 222, a fixed stop 224, a second color filter 226, and a lens rear group 228.

The first and second color filter plates 222 and 226 are made of, for example, transparent glass plate. Specifically, a central portion of the filter plate is transparent, and its both side portions have color filter films of different colors deposited thereon. In the example shown in FIG. 2, the first color filter plate 222 has C(cyan) and Y(yellow) color filters, and the second color filter plate 226 has C(cyan) and M(magenta) color filters.

Therefore, by controlling the first and second color filter plates 222 and 226 so as to adjust the extent of insertion (Y, M, C) of each color filter into the light path L, it is possible to adjust the quality of the reflected light passing through the light path L.

Specifically, the extent of insertion (Y, M, C) of each color filter of the first and second color filter plates 222 and 226 into the light path L is adjusted by a combination of gears 222b and 226b provided at the shaft ends of stepping motors 222a and 226a acting as driving source, reducing gears 222c and 226c in gear with the gears 222b and 226b, and racks 222d and 226d provided on the first and second color filter plates 222 and 226 that are in gear with the reducing gears 222c and 226c.

In the example illustrated, when the stepping motor 222a rotates clockwise, the first color filter plate 222 moves rightward in the drawing, so that a cyan filter C (referred to as the C filter) is inserted into the light path L in proportion to the extent of rotation of the stepping motor 222a. Similarly, when the stepping motor 222a rotates counterclockwise, the first color filter plate 222 moves leftward, so that a yellow filter Y (referred to as the Y filter) is inserted into the light path L in proportion to the extent of rotation of the stepping motor 222a.

On the other hand, when the stepping motor 226a rotates clockwise, the second color filter plate 226 moves rightward in the drawing, so that the C filter is inserted into the light path L. Similarly, when the stepping motor 226a rotates counterclockwise, the second color filter plate 226 moves leftward, so that a magenta filter M (referred to as the M filter) is inserted into the light path L in proportion to the extent of rotation of the stepping motor 226a.

As shown in FIG. 1, to adjust the quantity of light by each variable stop 66 and the quality of light by the color filter Y, M, C at the time of subsidiary exposure and of main exposure, a control unit 76 is connected with the variable stop 66 and the lens unit 68, which controls the degree of aperture D and the extent of insertion (Y, M, C) of each color filter Y, M, C.

Provided in the rear of the lens unit 68 in the direction of the light path L are mirrors 70a, 70b and 70c for reflecting the reflected light in given directions. The reflected light passing along the light path L is reflected in given directions by the individual mirrors, and focused, at a given position within the exposing section 34, on the light-sensitive material A under scanning-conveyance to expose the light-sensitive material A.

Provided in the rear of the mirror 70c is a movable mirror 74 which switches the light path of the reflected light to either the side of the exposing section 34 or the side of an image sensor 72.

Specifically, although the movable mirror 74 is moved by known means and held in the retracted state from the light path L during normal exposure, it is moved and inserted into the light path L as illustrated to reflect the reflected light toward the image sensor 72 at the time of auto setup, white balance adjustment, or pre-scanning.

Figure 3:
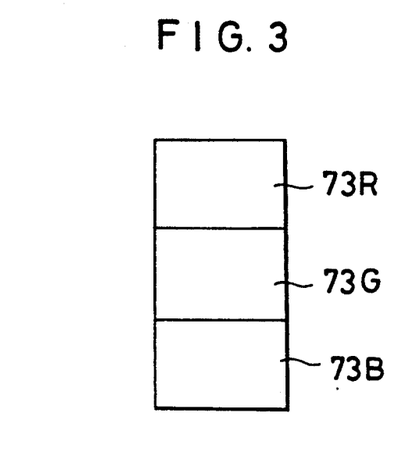
FIG. 3 is a schematic view showing an embodiment of an image sensor including color sensors usable in the copying machine shown in FIG. 1.

The image sensor 72 is used to measure the quantity and quality of the reflected light at the time of auto setup, white balance adjustment, and pre-scanning, and as shown in FIG. 3, has a red (R) sensor 73R, a green (G) sensor 73G, and a blue (B) sensor 73B built therein. Although it is enough to include one sensor per one color, there may be included two light sensors per one color. In this case, the strength of light is measured in terms of two kinds of wavelength per one color.

The image sensor 72 is electrically connected with the control unit 76 so that the photometric data of each color R, G, B obtained by the image sensor 72 is sent to the control unit 76. A memory unit 78 may be connected with the control unit 76 if necessary. As described above, the motor 212 of the variable stop 66 and the motors 222a and 226a of the lens unit 68 are connected with the control unit 76. The control unit 76 includes a CPU, a ROM, and/or a RAM. The memory unit 78 includes a RAM and/or a ROM.

Provided on the right side of the exposing unit 14 is a cooling fan 79.

The exposing unit 14 of the copying machine 10 is configured fundamentally in the form of a single unit and made accessible by means of hinges not shown provided in the housing 12 so that individual inner components can be readily inspected, repaired, and so on.

The light-sensitive material A having been exposed by the exposing unit 14 in the exposing section 34 is turned upside down in a reversing section 80 such that the sensitive surface faces down, and conveyed to the water applying section 20 by conveyor roller pairs 82 and guide rollers 84.

In the water applying section 20, water or the image forming solvent is applied to the light-sensitive material A having been exposed.

Figure 4:
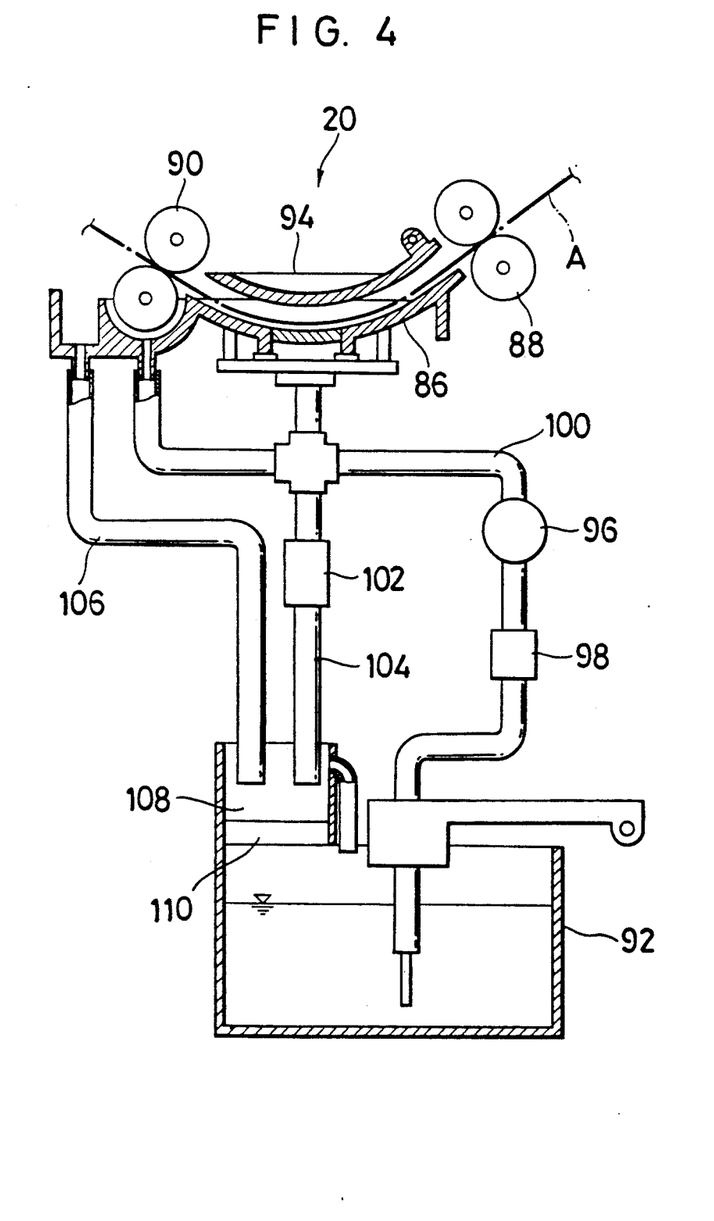
FIG. 4 is a schematic view showing an example of a water applying section usable in the copying machine shown in FIG. 1.

FIG. 4 shows an example of the water applying section 20.

The water applying section 20 shown in FIG. 4 includes an applying tank 86, a conveyor roller pair 88 provided in front of the applying tank 86, a squeeze roller pair 90 provided in the rear of the tank 86, and a water reserve tank 92.

Provided in confronting relation to the applying tank 86 is a conveyor guide 94 for the light-sensitive material A.

The light-sensitive material A conveyed from the reversing section 80 is conveyed into the applying tank 86 by the conveyor roller pair 88, and applied with water or the image forming solvent while moving between the applying tank 86 and the conveyor guide 94. Extra water is removed by the squeeze roller pair 90, and the light-sensitive material A is conveyed to a subsequent stage.

The applying tank 86 is connected with a supply line 100 including a pump 96 and a filter 98, so that water is supplied from the reserve tank 92.

The bottom of the applying tank 86 is connected with a discharge line 104 including a normally-closed electromagnetic valve 102, so that when the electromagnetic valve 102 is opened, the water held in the applying tank 86 is discharged into the reserve tank 92.

The applying tank 86 is further connected with an overflow line 106 so that extra water in the applying tank 86 is discharged into the reserve tank 92.

The discharge line 104 and the overflow line 106 are in communication with a chamber provided in a side 108 of the reserve tank 92, and the water coming to this chamber is discharged through a filter 110 into the reserve tank 92.

The image forming solvent in the present invention should not be limited to water, but may be a mixture of water and a solvent of low boiling point, such as methanol, DMF, acetone, or isobutyl ketone. It is preferable to store an antifoaming agent together with the image forming solvent in the reserve tank 92.

Provided in the rear of the water applying section 16 is the heat developing/transcribing section 18.

The image receiving material B pulled out of the image receiving material magazine 24 in the supply section and cut to a given length by the cutter 32 is conveyed to the heat developing/transcribing section 18 by conveyor roller pairs 112.

Provided at the inlet of the heat developing/transcribing section 18 is a laminating roller 114 by which the water-applied light-sensitive material A and the image receiving material B thus conveyed are laminated together such that the light-sensitive material A is ahead of the image receiving material B by about 5 mm.

Provided in front of the laminating roller 114 in the conveyor path of the image receiving material B is a resist roller pair 116 which acts, on the basis of the position of the image receiving material B being detected by a sensor not shown, as to cause the light-sensitive material A and the image receiving material B to be laminated together in a given positional relationship.

The heat developing/transcribing section 18 is composed of a heating drum 118 including halogen lamps 118a and 118b acting as heating source, and an endless belt wound around the periphery of the heating drum 118 in an angular range of about 270° and stretched around four belt-supporting rollers 120a, 120b, 120c and 120d. Consequently, the light-sensitive material A and the image receiving material B are heated under the laminated condition. By this heating process, the latent image of the light-sensitive material A created by exposure in the exposing section 34 is developed and transcribed onto the image receiving material B, leading to coloring.

One of the heating halogen lamps 118a and 118b has a rating of about 400W, and the other has a rating of about 800W, for example. When heating the heating drum 118 to given temperature (about 78° C.), both lamps are powered, whereas during a normal operation, one halogen lamp of 800W rating is powered to heat the heating drum 118.

Provided in the heat developing/transcribing section 18 are a first separating pawl 126 and a guide roller 128 for separating the light-sensitive material A from the image receiving material B and conveying it into a reject tray 124, and a second separating pawl 132 and a guide roller 134 for separating the image receiving material B from the heating drum 118 and conveying into a take-out tray 130.

Specifically, for the light-sensitive material A and the image receiving material B having been heated and transcribed by the heating drum 118 an the endless belt 122, first, the light-sensitive material A is separated by the first separating pawl 126, conveyed by the guide roller 128 toward the reject tray 124, and conveyed into the reject tray 124 by a conveyor roller pair 136. On the other hand, the image receiving material B remaining on the heating drum 118 still rotating is separated from the heating drum 118 by the second separating pawl 132, conveyed by the guide roller 134 toward the take-out tray 130, and conveyed into the take-out tray 130 by a conveyor roller pair 138.

Provided in the rear of the conveyor roller pair 136 is a cutter 140 for tearing the light-sensitive material A being rejected to pieces, so that the light-sensitive material A is discharged into the reject tray 124 after being torn to pieces.

Figure 5:
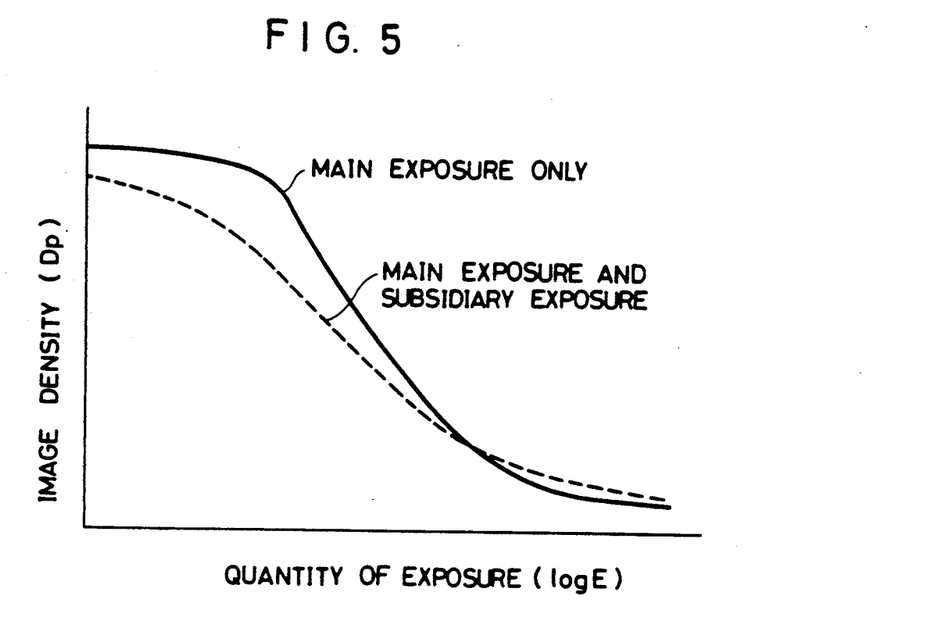
FIG. 5 is a graph showing the relationship between image density and exposure.

The image forming apparatus according to the present invention makes it possible by performing subsidiary exposure to adjust the gradation of an image being formed. In the copying machine 10 illustrated, the light-sensitive material A conveyed to the exposing section 34 is subjected to subsidiary exposure by the exposing unit 14, so that the gradation of the image being finally copied is adjusted as shown in FIG. 5.

According to the first aspect of the present invention, for the purpose of providing the color and intensity conditions of subsidiary exposure that are preset in accordance with the amount of adjustment of gradation, the control unit 76 of the exposing unit 14 controls the amount of adjustment of the quantity of light of subsidiary exposure by means of the variable stop 66 and the extent of insertion of each color filter of the first and second color filter plates 222 and 226 of the lens unit 68.

In this connection, a LUT (look-up table) of the memory unit 78 holds combinations of the amount of adjustment of the quantity of light, the extent of insertion of each color filter, and the amount of adjustment of gradation, for example, in the form of correction values which are deviations from the standard conditions of subsidiary exposure. Where the control unit 76 is equipped with a ROM or RAM, the LUT or the like of such a memory can hold the foregoing combinations, namely, the exposure conditions (Y, M, C, D), such as the color and intensity conditions ($\Delta Y, \Delta M, \Delta C, \Delta D$) of subsidiary exposure pertaining to the amount of adjustment of gradation, and the standard conditions of main exposure and of subsidiary exposure; therefore, it is unnecessary to provide the memory unit 78, besides the control unit 76.

According to the first aspect of the present invention, the LUT or the like of the control unit 76 or the memory unit 78 of the exposing unit 14 holds the standard conditions of main exposure without subsidiary exposure, the standard conditions of main exposure and of subsidiary exposure at the time of subsidiary exposure, and the amount of adjustment of the quantity of light (attained by the variable stop 66) and the extent of insertion of each color filter pertaining to the amount of adjustment of gradation at the time of subsidiary exposure

| Example | Y | M | C | D (cc) |
|---|---|---|---|---|
| (1) Main exposure standard conditions without subsidiary exposure; | 0 | 0 | 0 | 50 |
| (2) Main exposure standard conditions at the time of subsidiary exposure; | 0 | 0 | 0 | 55 |
| Subsidiary exposure standard conditions at the time of subsidiary exposure; | 0 | 0 | 0 | 30 |
| (3) Subsidiary exposure conditions pertaining to the amount of adjustment of gradation; | | | | |

TABLE 1

|   | +3 | +2 | +1 | 0 | −1 | −2 | −3 |
|---|---|---|---|---|---|---|---|
| Y | 0 | 0 | 0 | 0 | 0 | 0 | 0 |
| M | 0 | 0 | 0 | 0 | 2 | 4 | 4 |
| C | 0 | 0 | 0 | 0 | 3 | 5 | 5 |
| D | 40 | 36 | 32 | 30 | 28 | 24 | 20 |

In Table 1, Y, M, C designates the extent of insertion of the Y,M,C filter, and D designates the degree of aperture of the variable stop 66.

In Table 1, "0" at the center of the top row corresponds to the standard conditions at the time of subsidiary exposure, and increasing towards "+1" along the top row from the standard conditions makes the gradation harder, whereas a decreasing towards "−1" along the top row makes the gradation softer.

In case the change of gradation is provided such that with the standard conditions at the center, the amount of correction of color and/or intensity at the time of subsidiary exposure increases as departing from the standard conditions of subsidiary exposure, an operator can readily choose a desired gradation at the time of image forming, leading to desirable results.

In the copying machine 10, when the operator chooses subsidiary exposure mode, that is photographic mode, since the standard conditions of subsidiary exposure relating to adjustment of the quantity and quality of light are "0", none of the Y, M, C color filters of the lens unit 68 are inserted into the light path L, and the degree of aperture of the variable stop 66 is set to 30cc.

Figure 6:
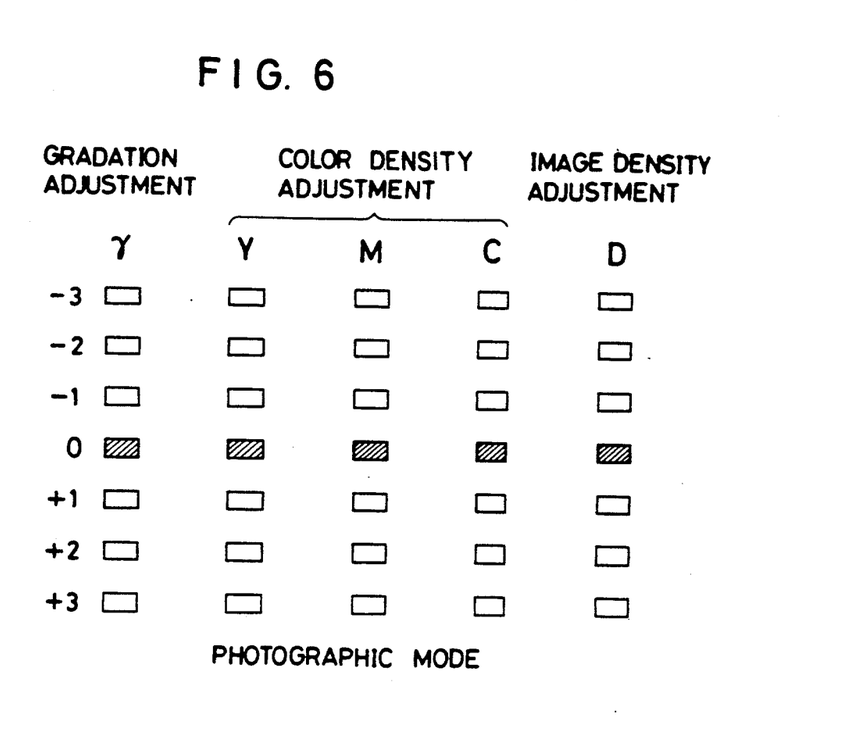
FIG. 6 is a schematic diagram showing an example of a control panel usable in the copying machine shown in FIG. 1.

When the operator chooses gradation "−2", for example, on a control panel as shown in FIG. 6 after choosing the subsidiary exposure mode, the stepping motor 212 rotates counterclockwise to set the degree of aperture of the variable stop 66 to 24cc, the stepping motor 222a rotates clockwise to insert the C filter of the first color filter plate 222 into the light path L by 5cc, and the stepping motor 226a rotates counterclockwise to insert the M filter of the second color filter plate 226 into the light path L by 4cc, whereby the subsidiary exposure conditions providing a given gradation are set.

Under the subsidiary exposure conditions thus set, the light source unit moves ( before or after performing main exposure ) to illuminate the reflecting plate 56 by means of the light source 60, so that the light-sensitive material A conveyed to the exposing section 34 is exposed (subsidiarily) with a given quantity of light corresponding to about 1/50 to 1/100 of the quantity of light of main exposure, whereby the gradation of an image being copied and formed is adjusted as shown in FIG. 5.

Generally, the γ characteristic of the image subjected to subsidiary exposure changes as shown in FIG. 5, so that the gradation becomes soft compared to the case of no subsidiary exposure incorporated. Therefore, where a light-sensitive material to be used is hard in gradation or of the type adapted to copy printed or monochromatic papers or documents, the subsidiary exposure mode (photographic mode) is suitable in copying halftone or linear-gradation pictures.

According to the first aspect, the adjustment of gradation by subsidiary exposure is performed under the color and/or intensity conditions of subsidiary exposure predetermined in accordance with the amount of adjustment of gradation; therefore, an image of desired gradation can be readily formed. Since subsidiary exposure is performed under the color and/or intensity conditions of subsidiary exposure predetermined in accordance with the amount of adjustment of gradation, the color and/or intensity of subsidiary exposure light as well as the quantity thereof can be desirably adjusted in attaining desired gradation adjustment.

Specifically, in the copying machine 10 illustrated, the reflecting plate 56 is illuminated by the exposing light source 60, the quantity of the reflected light is adjusted by the variable stop 66, and the quantity and quality of the reflected light are further adjusted by the individual color filters provided in the lens unit 68. Therefore, the balance of color is never distorted when forming images of any desired gradation, resulting in natural and fine images copied.

Preferably, in the copying machine 10 illustrated, the amount of adjustment of gradation is adjusted on the basis of the color and/or intensity standard conditions determined by the quantity of subsidiary exposure light, the color and/or intensity conditions of subsidiary exposure are given in the form of the amounts of correction of color and/or intensity that are deviations from the standard conditions, the amounts of correction are previously stored in the LUT or the like of the control unit 76 or the memory unit 78 in the form of combinations, and subsidiary exposure is performed on the basis of these combinations.

In the present invention, the color and/or intensity conditions of subsidiary exposure and their combinations are preferably determined considering the characteristics and developing conditions of a light-sensitive material so as to provide optimal images.

Images formed by the image forming apparatus are largely influenced by the characteristics of each light-sensitive material used and the operating conditions of developing means such as the heat developing unit. Therefore, the standard conditions ( of main exposure ) are generally set in the copying machine by the use of test charts or the like, this process being called "setup".

In the present invention, the gradation of an image being formed is adjusted by subsidiary exposure. Similarly to the setup process of main exposure, the standard conditions of subsidiary exposure and the color and/or intensity conditions for each gradation are set considering the characteristics and developing conditions of a light-sensitive material and stored in the LUT or the like of the control unit 76 or the memory unit 78, whereby fine images can always be formed.

In this way, the subsidiary exposure conditions depending on the characteristics of the light-sensitive material can be automatically set by adding the changes of Y, M, C and D obtained in the setup process of main exposure to the standard conditions at the time of subsidiary exposure.

In the present invention, the color and/or intensity conditions at the time of main exposure may be adjusted in accordance with the adjustment of gradation by subsidiary exposure.

Specifically, where the standard conditions of main exposure in the standard mode without subsidiary exposure are such that the degree of aperture of the variable stop 66 with no insertion of any color filter is 50cc, and the main exposure conditions in the subsidiary exposure mode are such that the degree of aperture of the variable stop 66 with no insertion of any color filter is 55cc, when the operator chooses a desired gradation ( for example, "−1" ) not included in the standard conditions, the main exposure conditions can be corrected on the basis of the standard conditions of main exposure in the subsidiary exposure mode so as to change the degree of aperture of the variable stop 66, insert each color filter of the lens unit 68, and change the extent of insertion thereof.

As described above in greater detail, the image forming apparatus according to the first aspect of the present invention can adjust the gradation of an image by subsidiary exposure; therefore, at the time of gradation adjustment by subsidiary exposure, the color and/or intensity conditions of subsidiary exposure predetermined in accordance with the amount of adjustment of gradation are set.

Consequently, the operator can choose any desired gradation to form images of desired gradation.

Further, when the gradation of an image being formed is set to any desired level, the color and/or intensity of subsidiary exposure is desirably adjusted, so that natural and fine images of desired gradation can be formed with no color balance distorted.

When scanning exposure is to be performed, generally, the optimal image forming conditions or the standard conditions of color and/or intensity of main exposure are automatically set (at the time of machine installation, changing of the light-sensitive material and/or image receiving material, and periodic inspection) to cope with variations in the characteristics and developing conditions of the light-sensitive and/or image receiving material. In the image forming apparatus according to the second aspect of the present invention, additionally, the standard conditions of color and/or intensity of subsidiary exposure are concurrently set automatically.

To set the standard conditions of color and/or intensity of main exposure, a test chart is used for a copying machine or the like, or a test chart pattern is used for a printer or the like. Hard copies actually formed from the test chart or test pattern are compared with the test chart in terms of color and/or intensity reproducibility by means of the image sensor (comprising red (R) sensor, green (G) sensor, and blue (B) sensor) included in the exposing unit of the image forming apparatus. With regard to colors, the amounts of adjustment of Y (yellow), M (magenta) and C (cyan), i.e. the extents of insertion of Y filter, M filter and C filter, are set in the form of standard values (to give optimal color). With regard to density, the degree of aperture D is set in the form of a standard value (to give optimal density). These set values corresponding to the Y, M and C filters and the degree of aperture D are used as the standard conditions of main exposure. In the second aspect of the present invention, the subsidiary exposure conditions to form optimal images whose gradation will be adjusted by subsidiary exposure before main exposure can be obtained from the foregoing main exposure conditions on the basis of the correlation between the main exposure conditions and the subsidiary exposure conditions that is stored in the memory unit. Let the reference values of Y, M, C and D of main exposure be "0" (corresponding to the case none of the filters are inserted in the light path of exposure) and the standard conditions set to cope with variations in the characteristics and processing conditions of the light-sensitive and/or image receiving material be $\Delta Y$, $\Delta M$, $\Delta C$ and $\Delta D$. Then, the differences between the reference values and the standard conditions being actually set become $\Delta Y$, $\Delta M$, $\Delta C$ and $\Delta D$. Therefore, the differences between the standard conditions (to form optimal images) of subsidiary exposure whose quantity of light is $\Delta Ds$ (a deviation from the reference value) and the reference values (for example, "0" = the extent of insertion) of Y, M, C and D of subsidiary exposure become $\Delta Ys$, $\Delta Ms$, $\Delta Cs$ and $\Delta Ds$.

The relational expressions between ($\Delta Y$, $\Delta M$, $\Delta C$, $\Delta D$) and ($\Delta Ys$, $\Delta Ms$, $\Delta Cs$, $\Delta Ds$) are as follows:

$$\Delta Ys = k_1 \cdot \Delta Y + \alpha$$

$$\Delta Ms = k_2 \cdot \Delta M + \beta$$

$$\Delta Cs = k_3 \cdot \Delta C + \gamma$$

where ($k_1$, $k_2$, $k_3$) and ($\alpha$, $\beta$, $\gamma$) are constants determined in accordance with $\Delta Ds$ and $\Delta D$.

Specifically, letting the subsidiary exposure standard conditions of the Y, M and C color filters pertaining to i-th subsidiary exposure whose quantity of light is $\Delta D_n$ be $\Delta Ys_n$, $\Delta Ms_n$ and $\Delta Cs_n$ (i=1 ... n), the following expression holds:

$$\begin{pmatrix} \Delta Ys_1, & \Delta Ms_1, & \Delta Cs_1 \\ \Delta Ys_2, & \Delta Ms_2, & \Delta Cs_2 \\ \vdots & \vdots & \vdots \\ \Delta Ys_n, & \Delta Ms_n, & \Delta Cs_n \end{pmatrix} = \begin{pmatrix} k_{11}, & k_{12}, & k_{13} \\ k_{21}, & k_{22}, & k_{23} \\ \vdots & \vdots & \vdots \\ k_{n1}, & k_{n2}, & k_{n3} \end{pmatrix} \cdot$$

$$\begin{pmatrix} \Delta Y & 0 & 0 \\ 0 & \Delta M & 0 \\ 0 & 0 & \Delta C \end{pmatrix} + \begin{pmatrix} \alpha_1, & \beta_1, & \gamma_1 \\ \alpha_2, & \beta_2, & \gamma_2 \\ \vdots & \vdots & \vdots \\ \alpha_n, & \beta_n, & \gamma_n \end{pmatrix} \leftarrow \begin{pmatrix} \Delta Ds_1 \\ \Delta Ds_2 \\ \vdots \\ \Delta Ds_n \end{pmatrix}$$

The memory unit of the present invention stores $$K = \begin{pmatrix} k_{11}, & k_{12}, & k_{13} \\ k_{21}, & k_{22}, & k_{23} \\ \vdots & \vdots & \vdots \\ k_{n1}, & k_{n2}, & k_{n3} \end{pmatrix}$$

and $$AL = \begin{pmatrix} \alpha_1, & \beta_1, & \gamma_1 \\ \alpha_2, & \beta_2, & \gamma_2 \\ \vdots & \vdots & \vdots \\ \alpha_n, & \beta_n, & \gamma_n \end{pmatrix}$$

It should be noted that since the prior art performs no color balance correction in the process of subsidiary exposure, both K and AL of the foregoing relational expressions can be considered as "0".

As will be appreciated, the second aspect and the first aspect of the present invention differs from each other in function of the control unit 76 and memory unit 78 of the exposing unit of the copying machine 10 shown in FIG. 1.

According to the second aspect, the control unit 76, at the time of pre-scanning, sends the color density signals of R, G and B from the image sensor 72 to the memory unit 78; at the time of auto setup or white balance adjustment, determines on the basis of the color density signals and the data previously stored in the memory unit the standard conditions of color and/or intensity of main exposure, the standard conditions of color and/or intensity of subsidiary exposure, and the exposure correction conditions of color and intensity used at the time of adjustment and exposure; and adjusts on the basis of those conditions the extent of insertion of each color filter Y, M, C and the extent of insertion of aperture D.

The memory unit 78 stores in the form of, for example, a LUT the correlation data between color density and color filter of Y, M, C; the correlation data between main exposure standard condition and subsidiary exposure standard condition (for example, the data of determinants K and AL); data necessary to determine other main exposure conditions and/or subsidiary exposure conditions; and so on.

The present invention should not be limited to the copying machine shown in FIG. 1, but may be applied to different copying machines and color printers which will include some processing units necessary for image forming (such as exposing unit, developing and fixing water tank, pressure transcribing unit and heat developing unit) depending on the type of light-sensitive and/or image receiving material (such as silver-salt photo sensitive, pressure sensitive, or heat developing type).

The image forming apparatus of the present invention is generally configured as described above. The second aspect of the present invention will be described with reference to the copying machine 10 shown in FIG. 1.

Figure 7:
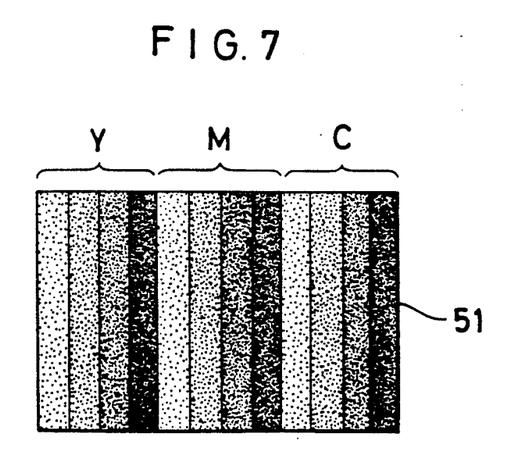
FIG. 7 is a front view showing an example of a test chart usable in a setup process for the copying machine shown in FIG. 1.

The copying machine 10 embodying the image forming apparatus of the present invention is adapted to adjust the gradation of an image by performing subsidiary exposure. Generally, the characteristics and processing conditions of the light-sensitive and/or image receiving material change. Therefore, at the time of installation of the copying machine 10, changing of the light-sensitive and/or image receiving material, periodic inspection, and so on, the standard conditions of color and/or intensity of main exposure to form optimal images in compliance with the sensitive and/or image receiving material used are set in the setup process using a test chart 51 as shown in FIG. 7. At the same time, subsidiary exposure is performed to adjust the gradation, whereby the standard conditions of color and/or intensity of subsidiary exposure are set automatically. Here, it is preferable that the standard conditions of main exposure be set automatically in the auto setup process.

To perform the auto setup process, an auto setup mode is chosen, the test chart 51 shown in FIG. 7 is placed on the original bed 52 of the copying machine 10, and a start switch not shown is turned on to cause the exposing unit 14 to perform pre-scanning.

In the pre-scanning process, the light source 60 is turned on, the lower surface of the original bed 52 is scanned by the light source unit, and the reflected light from the original 50 is reflected by the mirror unit moving in the same direction as the light source unit at a speed corresponding to half that of the light source unit. After passing through the variable slit or stop 66 and the lens unit 68 with no color filter inserted, the reflected light is reflected by the mirrors 70a, 70b and 70c and by the reflecting mirror 74 positioned as illustrated. Then, the reflected light enters the image sensor 72; consequently, the color densities of R, G, B of the reflected light are measured by the three color sensors 73R, 73G, 73B of R, G, B and provided in the form of electrical signals. These color density signals are sent to the control unit 76 and to the memory unit 78 where they are stored. The control unit 76 determines the amounts of correction of color filters and aperture for main exposure.

During the pre-scanning process, on the other hand, the light-sensitive material A is pulled out of the light-sensitive material magazine 22 by the take-out roller pair 26 and cut to a given length by the cutter 30.

The light-sensitive material A thus cut to a given length is conveyed by the conveyor roller pairs 38 and 40 in the exposing section 34, guided along the upper conveyor path of the branch guide 42 by the flapper 44, turned upside down in the reversing section 36 such that the sensitive surface faces up, after passed through the branch guide 42, conveyed again to the exposing section 34 with the sensitive surface facing up, and held at a given position on standby.

Upon termination of the pre-scanning process, the light source unit and the mirror unit return to their home positions.

Then, the motors 212, 222a and 226a are actuated so that the variable stop 66 and the color filter plates 222 and 226 for Y, M, C color of the lens unit 68 are moved in such a manner that the degree of aperture and the extent of insertion of each color filter into the light path L of exposure are corrected in accordance with the foregoing amounts of correction. The movable mirror 74 is retracted from the light path L, and the light path L is directed to the exposing section 34.

Then, main exposure is started. In the main exposure process, the exposing unit 14 is actuated in the same manner as in the pre-scanning process, so that the test chart 51 is scanned by the light source 60, and at the same time, the light-sensitive material A pinched by the conveyor roller pairs 38 and 40 is conveyed in a scanning manner rightward in FIG. 1 in synchronization with the scanning speed of the light source 60 so that the picture of the test chart 51 is transcribed onto the light-sensitive material A through scanning exposure.

Upon termination of exposure, the light-sensitive material A is turned upside down in the reversing section 80, conveyed to the water applying section 20 with the sensitive surface facing down, and passed through the applying tank 86 while being conveyed by the conveyor roller pair 88 and the squeeze roller pair 90, whereby water or the image forming solvent is applied. Excess water applied in the applying tank 86 is removed by the squeeze roller pair 90.

On the other hand, the image receiving material B is pulled out of the image receiving material magazine 24 by the take-out roller pair 28, cut to a given length by the cutter 32, conveyed by the conveyor roller pairs 112, and held at a given position on standby by the resist roller pair 116.

When the light-sensitive material A is conveyed to a given position, the resist roller pair 116 begins to convey the image receiving material B, and the light-sensitive material A and the image receiving material B are laminated together by the laminating roller 114.

The light-sensitive material A and the image receiving material B laminated together by the laminating roller 114 are conveyed while being pinched between the heating drum 118 and the endless belt 122 in the heat developing section 18, the latent image carried on the light-sensitive material A is heat-developed and transcribed onto the image receiving material B, leading to coloring.

Then, the light-sensitive material A is separated from the image receiving material B by the first separating pawl 126, guided by the guide roller 128, conveyed by the conveyor roller pair 136, torn to pieces by the cutter 140, and discharged into the reject tray 124. On the other hand, the image receiving material B is separated from the heating drum 118 by the second separating pawl 132, guided by the guide roller 134, conveyed by the conveyor roller pair 138, and discharged into the take-out tray 130.

The thus obtained test chart copy in the form of the image receiving material B is placed on the original bed 52, and the start switch is turned on. Consequently, pre-scanning takes place in the same manner as above. The color densities of Rm, G, B of the test chart copy are measured in the form of electrical signals by the image sensor 72 and sent to the control unit 76.

The control unit 76 compares the color density data received of the test chart copy with the color density data of the test chart previously stored in the memory unit 78, calculates the differences of each color and intensity, and on the basis of the differences calculated and the correlation data stored in the memory unit 78 between the density of each color and the extent of insertion of each color filter and between the density and the degree of aperture, determines the standard conditions to provide optimal main exposure, that is, the extends of insertion $\Delta Y$, $\Delta M$, $\Delta C$, $\Delta D$ of each color filter Y, M, C and aperture D into the light path L. Further, at the time of main exposure, the control unit adjusts the extent of insertion of each color filter Y, M, C and aperture D so as to provide the standard conditions.

When the standard conditions $\Delta Y$, $\Delta M$, $\Delta C$, $\Delta D$ of main exposure are determined as above, in the present invention, the standard conditions $\Delta Ys$, $\Delta Ms$, $\Delta Cs$, $\Delta Ds$ of subsidiary exposure are determined as described above in accordance with the following expression:

$$(\Delta Ys_i, \Delta Ms_i, \Delta Cs_i) = K \cdot \begin{pmatrix} \Delta Y & 0 & 0 \\ 0 & \Delta M & 0 \\ 0 & 0 & \Delta C \end{pmatrix} + AL$$

$(i = 1 \ldots n)$ where $K = \begin{pmatrix} k_{11}, & k_{12}, & k_{13} \\ k_{21}, & k_{22}, & k_{23} \\ \cdot & \cdot & \cdot \\ k_{n1}, & k_{n2}, & k_{n3} \end{pmatrix}$ and $AL = \begin{pmatrix} \alpha_1, & \beta_1, & \gamma_1 \\ \alpha_2, & \beta_2, & \gamma_2 \\ \cdot & \cdot & \cdot \\ \alpha_n, & \beta_n, & \gamma_n \end{pmatrix}$ The data of K and AL is previously obtained by actually performing copying under certain developing conditions using certain sensitive and image receiving materials and after calculation, store din the memory unit 78.

Here, assume that the quantity of light of subsidiary exposure $\Delta Ds$ takes three ranges of ($+20$ to $+10$), ($+10$ to $-10$), and ($-10$ to $-20$). Then, the other data can be obtained in the following manner:

| $\Delta Ds$ | $\Delta Ys$ |
|---|---|
| $+20$ to $+10$ | $k_{11} \cdot \Delta Y + \alpha_1$ |
| $+10$ to $-10$ | $k_{21} \cdot \Delta Y + \alpha_2$ |
| $-10$ to $-20$ | $k_{31} \cdot \Delta Y + \alpha_3$ |
| $\Delta Ms$ | $\Delta Cs$ |
| $k_{12} \cdot \Delta M + \beta_1$ | $k_{13} \cdot \Delta C + \gamma_1$ |
| $k_{22} \cdot \Delta M + \beta_2$ | $k_{23} \cdot \Delta C + \gamma_2$ |
| $k_{32} \cdot \Delta M + \beta_3$ | $k_{33} \cdot \Delta C + \gamma_3$ | for example, where the quantity of light of subsidiary exposure $\Delta Ds = -20$cc, e.g.

| | Y | M | C | D |
|---|---|---|---|---|
| (i) main exposure initial value (without subsidiary exposure) | 0 | 0 | 0 | 50 cc |
| (ii) subsidiary exposure initial value (at the time of subsidiary exposure) | 0 | 0 | 0 | 30 cc |

(that is, where $k_{31} = k_{32} = k_{33} = 1$, $\alpha_3 = \beta_3 = \gamma_3 = 0$), if sensitivity changes due to variations in the characteristics and/or processing conditions of the light-sensitive material, (i) is set as follows:

| | | | | |
|---|---|---|---|---|
| (i) main exposure standard setting (at the time of subsidiary exposure) | 10 | 5 | 0 | 40 cc | then, the following is obtained:

| | | | | |
|---|---|---|---|---|
| (ii) subsidiary exposure standard setting (at the time of subsidiary exposure) | 10 | 5 | 0 | 20 cc |

In the present invention, to adjust the gradation of an image being finally copied and formed from the original 50, the light-sensitive material A is subjected to subsidiary exposure before or after main exposure in accordance with the subsidiary exposure standard conditions determined in the foregoing manner.

In the copying machine 10 illustrated, the operator places the original 50 on the original bed 52, closes the original bed cover 54, chooses the subsidiary exposure mode, and turns on the start switch; as a result, the exposing unit 14 first performs pre-scanning. During pre-scanning, the color densities of Y, M, C of the original 50 are measured by the image sensor and sent through the control unit 76 to the memory unit 78 where they are stored.

Upon termination of pre-scanning, to perform subsidiary exposure, the light source unit moves to the position where the light source 60 can illuminate the reflecting plate 56 for subsidiary exposure, and in response thereto, the mirror unit also moves. Further, the variable stop (D) 66 and the individual color filters Y, M and C provided in the lens unit 68 are set to the standard conditions of subsidiary exposure by the control unit 76. For example, the filters and the stop are controlled in terms of the extent of insertion so that Y=10cc, M=5cc, C=0cc, and D=20cc, as described above. The quantity of light $\Delta Ds$ of subsidiary exposure may be set to any level. The movable mirror 74 is retracted from the light path L.

After the subsidiary exposure conditions are set in the manner above, the light source 60 illuminates the reflecting plate 56. The reflected light from the reflecting plate 56 is reflected by the mirror unit, passed through the variable stop 66 and the lens unit 68 set to the given subsidiary exposure conditions (where the characteristics of the reflected light are adjusted), and reflected by the mirrors 70a, 70b and 70c. Then, the light-sensitive material A conveyed by the conveyor roller pairs 38 and 40 while being pinched between the exposing plane glass 41 and the pressure plate 43 is subjected to subsidiary exposure with a given quantity of light corresponding to about 1/50 to 1/100 of the quantity of light of main exposure.

Upon termination of subsidiary exposure, the conveyor roller pairs 38 and 40 are reversely rotated, so that the light-sensitive material is conveyed to the reversing section 36.

When the light-sensitive material A is conveyed to a given position in the opposite direction (toward the reversing section 36), the light source unit returns to its home position, the variable stop 66 and the lens unit 68 are properly adjusted in accordance with the image information obtained in the foregoing pre-scanning process, and then the process of main exposure is started. At this time, the reference values of the filter and aperture conditions of main exposure are set such that Y=10cc, M=5cc, C=0cc, and D=40cc, among which D may be set to 45cc in consideration of subsidiary exposure.

The light-sensitive material A subjected to main exposure in the same manner as above is applied with water, laminated with the image receiving material B, heat-developed, and separated from the image receiving material B, whereby an image is created and formed on the image receiving material B.

The thus formed image has the desired gradation not influenced by variations in the characteristics and processing conditions of the light-sensitive and/or image receiving material, thus is good in color balance and natural in view.

Having described the preferred embodiments of the image forming apparatus according to the present invention, the present invention should not be limited to those, but can be applied to various image forming apparatus using silver-salt photo type light-sensitive material or heat-sensitive pressure-sensitive type light-sensitive material, or of the wet development system or the electrophotography system.

Further, the exposing system should not be limited to the light source-moving/scanning exposure type as illustrated, but may be of the original bed-moving/scanning exposure type or the plane exposure type.

It is not intended to have the present invention limited to the foregoing embodiments, and many changed and modifications may be made without departing from the spirit of the present invention.

According to the second aspect of the present invention, the correlation data of exposure conditions between main exposure and subsidiary exposure is previously stored in the memory unit. Therefore, on the basis of the standard conditions of color and/or intensity of main exposure that are set to form optimal images, the standard conditions of color and/or intensity of subsidiary exposure that are used (at the time of main exposure) to adjust the gradation by subsidiary exposure can be set automatically. Consequently, even where variations arise in the characteristics and processing conditions of the light-sensitive material, image receiving material, and/or processing solvent, the color and/or intensity of subsidiary exposure can be preferably adjusted. Accordingly, natural and fine images of any gradation can be formed with no color balance distorted.

What is claimed is:

1. An image forming apparatus in which a gradation of an image being formed on a light-sensitive material is adjusted by subsidiary exposure, said apparatus comprising:
    exposure means for performing subsidiary exposure on the light-sensitive material in accordance with adjustable subsidiary exposure conditions and for performing main exposure on the light-sensitive material in accordance with main exposure conditions, the adjustable subsidiary exposure conditions including color and intensity conditions; and
    control means for controlling said exposure means to perform the subsidiary exposure and the main exposure, and for adjusting the gradation by setting the color and intensity conditions of the subsidiary exposure in accordance with an amount of adjustment of the gradation.

2. An image forming apparatus according to claim 1, wherein the amount of adjustment of the gradation is adjusted centering on standard conditions of the subsidiary exposure determined in accordance with a quantity of light of the subsidiary exposure.

3. An image forming apparatus according to claim 1, wherein the subsidiary exposure conditions of the subsidiary exposure are given in combinations of amounts of correction of colors and intensity that are deviations from standard conditions of the subsidiary exposure.

4. An image forming apparatus according to claim 3, wherein changing of said gradation from the standard conditions of the subsidiary exposure is set such that the amounts of correction of the colors and intensity of the subsidiary exposure increase as deviating from the standard conditions of the subsidiary exposure.

5. An image forming apparatus according to claim 1, wherein the subsidiary exposure conditions of the subsidiary exposure are set in accordance with characteristics and developing conditions of the light-sensitive material used so as to provide optimal images.

6. An image forming apparatus in which gradation of an image being formed is adjusted by subsidiary exposure, said apparatus comprising:
    exposure means for performing the subsidiary exposure in accordance with subsidiary exposure conditions and for performing main exposure in accordance with main exposure conditions;
    a memory unit for storing a relationship between standard subsidiary exposure conditions of said subsidiary exposure and standard main exposure conditions of main exposure with no subsidiary exposure performed, the subsidiary exposure conditions including color and intensity conditions; and
    means for automatically setting the color and intensity conditions of said subsidiary exposure from the standard main exposure conditions of said main exposure in accordance with the relationship stored in said memory unit.

7. An image forming apparatus according to claim 6, wherein said main exposure is scanning exposure.

8. An image forming apparatus according to claim 6, wherein said subsidiary exposure is performed before or after said main exposure or concurrently therewith.

9. An image forming apparatus according to claim 6, wherein a quantity of light of said subsidiary exposure corresponds to 1/50 to 1/100 of a quantity of light of main exposure.

10. An image forming apparatus according to claim 6, wherein said standard conditions of colors and intensity of the main exposure are set automatically.

11. An image forming apparatus according to claim 6, which uses a light-sensitive material.

12. An image forming apparatus according to claim 6, which is a copying machine.

13. A method for forming an image on a light-sensitive material, said method comprising the steps of:
    (a) selecting a desired gradation for the image to be formed on the light-sensitive material;
    (b) automatically setting predetermined color and intensity subsidiary exposure conditions in accordance with the desired gradation;
    (c) performing subsidiary exposure on the light-sensitive material in accordance with the predetermined color and intensity subsidiary exposure conditions; and
    (d) performing main exposure on the light-sensitive material in accordance with predetermined main exposure conditions.

14. A method according to claim 13, wherein the predetermined color and intensity subsidiary exposure conditions are dependent on characteristics and developing conditions of the light-sensitive material.

15. A method according to claim 13, wherein the intensity condition indicates exposure light is to be reduced to 1/50 to 1/100 of the intensity used for the main exposure.

* * * * *